Figure 1:
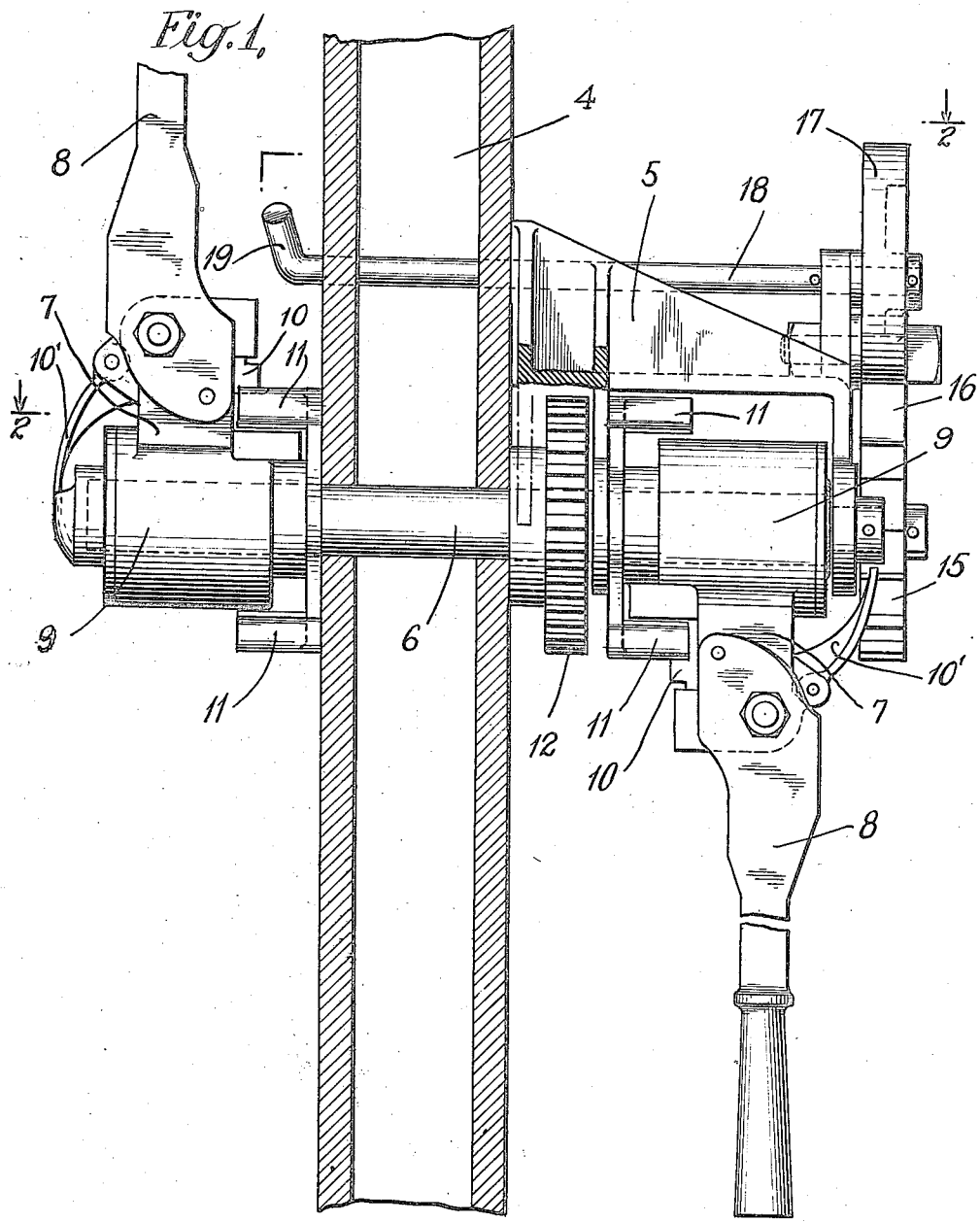

R. H. BLACKALL.
TUNNEL BRAKE.
APPLICATION FILED JUNE 28, 1915.

1,167,260.

Patented Jan. 4, 1916.
2 SHEETS—SHEET 1.

INVENTOR
Robert H. Blackall
BY
Pennie Davis & Marvin
ATTORNEYS

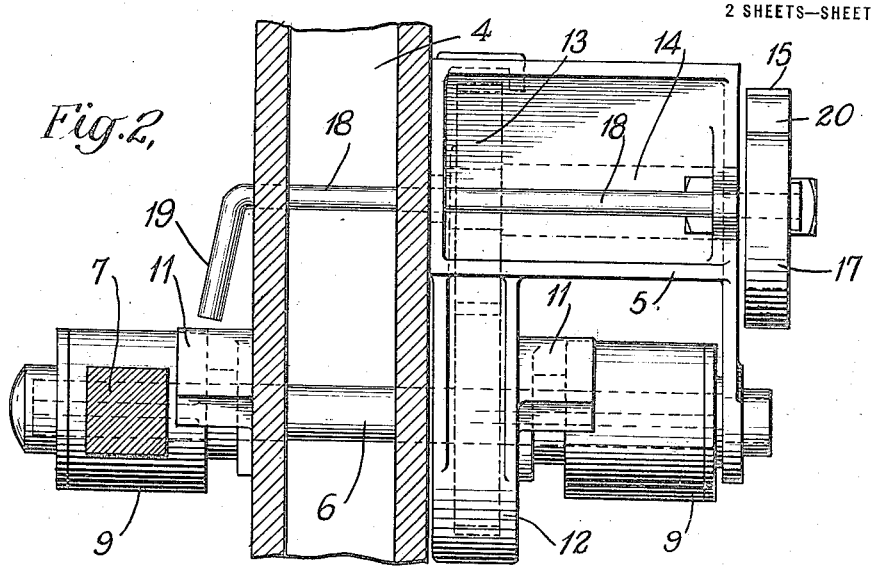

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

TUNNEL-BRAKE.

1,167,260.    Specification of Letters Patent.    Patented Jan. 4, 1916.

Application filed June 28, 1915.   Serial No. 36,772.

*To all whom it may concern:*

Be it known that I, ROBERT H. BLACKALL, a citizen of the United States, residing in Pittsburgh, county of Allegheny, State of Pennsylvania, have invented certain new and useful Improvements in Tunnel-Brakes; and I do hereby declare the following to be a full, clear, and exact description of the invention, such as will enable others skilled in the art to which it appertains to make and use the same.

This invention relates to brake actuating mechanism and more particularly to mechanism of the type which is carried by the blind end of baggage and express cars and the like. The brake actuating mechanism on these cars is attached to the outer surface of the blind end and is usually provided with hand operated means on the inside and outside of the car for rotating the brake shaft upon which the brake operating chain is wound.

According to the present practice, the hand operating means and the brake shaft are arranged in line with one another, with the result that there is an objectionable overhang. As a consequence of this, there is danger of the brake actuating mechanism being struck by the end of the next car of the train. If the brake shaft is shortened so as to reduce the overhang, the length of operating chain necessary to effect proper braking cannot be wound upon the drum without having more than one layer of chain on the drum, and the practical result is that the chain is liable to, and often does, wedge between a lap thereof and the end of the car or of the supporting bracket.

The purpose of this invention is to provide brake actuating mechanism for use in connection with cars having blind ends in which the overhang will be reduced to such an extent that there is no danger of any part of the mechanism being struck by the next car, and in which the winding drum will be sufficiently long to enable the necessary length of chain to be fully wound thereon without danger of wedging. This is accomplished by providing a shaft which is separate from the brake shaft and which is positioned alongside thereof instead of in line therewith. The shaft is geared to the brake shaft and carries hand operated means for rotating it.

In the accompanying drawings, in which is shown one embodiment of the invention: Figure 1 is a view in side elevation of the improved brake actuating mechanism, parts being broken away and the blind end of the car being shown in section; Fig. 2 is a sectional view taken on the line 2—2 of Fig. 1; and Fig. 3 is an end view thereof.

Referring to the drawings, 4 represents the blind end of the car to the outer surface of which a frame 5 is secured in any suitable manner. Rotatably supported by the frame is a shaft 6, the inner end of which extends through the car end and into the interior of the car. Hand operated devices 7 for rotating the shaft are carried thereby at its inner and outer ends in order that the brakes may be set either from within or without the car. For purposes of illustration, I have shown hand actuated ratchet mechanism, such as is described and claimed in my United States Letters Patent No. 1,066,702, dated July 8, 1913. Briefly, this mechanism comprises a handle 8 secured to a hub 9 which is rotatable with respect to the shaft 6 and which carries a pawl 10 adapted to coact with a ratchet fixed to the shaft. Two pawl disengaging elements 11 are placed on opposite sides of the center of oscillation of the handle, each of which is adapted to serve as a disengaging device or as a limiting stop. By inverting the pawl and ratchet, the operating lever can be arranged to work right-handedly or left-handedly, and in either case one of the elements 11 will disengage the pawl from the ratchet when the handle is moved backward to its extreme positions and the other element will limit the movement of the handle in the other direction. For a more complete disclosure of the details of that construction, reference is made to said Letters Patent. The hand levers carried by the shaft 6 are so arranged that one operates right-handed and the other left-handed. It is to be understood, however, that this invention is not to be limited to this particular form of shaft rotating means.

Mounted upon the shaft 6 is a gear wheel 12 which meshes with a gear wheel 13 secured to a brake shaft 14 rotatably supported by the frame 5. The upper portions of the gear wheels 12 and 13 are preferably housed by a portion of the frame as clearly indicated in Fig. 3 in order to protect them from injury and from snow or sleet.

Secured to the outer end of the brake shaft is a ratchet wheel 15 with which a pawl 16 is adapted to engage to prevent reverse rotation. The pawl 16, which is pivotally mounted upon the frame, is held in engagement with the ratchet wheel by means of a weight 17 mounted upon the outer end of a shaft 18 rotatably supported by the frame and having its inner end extending into the interior of the car. The inner end of the shaft 14 is bent as indicated at 19 to form a handle by means of which the shaft may be rotated to move the weight 17 into engagement with the pawl 16 or with an arm 20 carried by the pawl. The end of the brake operating chain 21 is secured to the brake staff 14 as is usual in mechanism of this character. When the brakes are being set the weight 17 is moved to engage the pawl and hold it in engagement with the ratchet wheel, as shown in Fig. 3.

Under normal conditions both of the handles 8 of the shaft operating devices 7 are so positioned that the pawls 10 are disengaged from their respective ratchets. The shaft 6 may therefore be rotated to set the brakes by operating either one of the handles 8, it being understood that when either handle is moved from its normal position, the pawl 10 associated therewith will engage the ratchet with which it coacts. As the pawl associated with the other handle is out of engagement with its ratchet, it will not interfere with the rotation of the shaft. After the brakes are set the handle which was operated is returned to its normal position in which the pawl 10 is disengaged from its ratchet, while the holding pawl 16 keeps the brakes set. When it is desired to release the brake the position of the weight 17 is shifted by taking hold of same, if the brakeman is on the outside of car; and by moving the handle 19 to opposite position, if on the inside of car, thus causing the weight 17 to rest on the arm 20 of the pawl 16. As soon as the strain is put upon the lever, pawl 16 drops out by gravity. It is then only necessary to let go of the handle and allow it to fly back to the release position due to the strain on the chain, at which time the pawl is without strain and the brake automatically releases. A graduated or progressive release of the brakes can also be obtained, either from inside or outside the car, by means of the pawl releasing levers 10′, in a manner well understood in the art.

What I claim is:

1. In combination with a car body, a horizontal brake staff rotatably supported thereby, a shaft rotatably supported by the car body and geared to the brake staff, and ratchet means for rotating the shaft.

2. In combination with a car body, a horizontal brake staff rotatably supported thereby, a shaft rotatably supported by the car body and geared to the brake staff, and hand operated means for ratcheting the shaft forward.

3. In combination with a car body, a brake staff rotatably supported thereby, a shaft rotatably supported by the car body and geared to the brake staff, hand operated ratchet mechanism for rotating the shaft and means for disengaging the ratchet mechanism.

4. In combination with a car body, a brake staff rotatably supported thereby, a shaft rotatably supported by the car body and geared to the brake staff, said shaft extending into the car, and means positioned inside of and outside of the car for rotating the shaft.

5. In combination with a car body, a frame secured to the outer surface of one of the end walls thereof, a horizontally disposed brake staff rotatably supported by the frame, a horizontally disposed shaft rotatably supported by the frame and extending through the end wall and into the car, the shaft being geared to the brake staff, and hand actuated ratchet mechanism positioned inside and outside of the car for rotating the shaft.

In testimony whereof I affix my signature.

ROBERT H. BLACKALL.